(12) United States Patent
Sasaki et al.

(10) Patent No.: US 6,643,729 B2
(45) Date of Patent: *Nov. 4, 2003

(54) DATA PROCESSING APPARATUS AND DATA RECORDING APPARATUS

(75) Inventors: Masao Sasaki, Kanagawa (JP);
Masaaki Isozaki, Kanagawa (JP);
Satoshi Miyazawa, Kanagawa (JP);
Satoshi Takagi, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/431,105

(22) Filed: Oct. 29, 1999

(65) Prior Publication Data
US 2003/0070040 A1 Apr. 10, 2003

(30) Foreign Application Priority Data
Oct. 30, 1998 (JP) .......................... 10-310839

(51) Int. Cl.$^7$ .................. G06F 12/00; G06F 12/16
(52) U.S. Cl. .................. 711/4; 714/701; 714/755; 386/124
(58) Field of Search .................. 360/1, 3, 17, 48, 360/49, 53, 61, 131–137; 386/34, 124–126; 710/9; 711/4, 202, 206, 216, 221; 714/6, 27, 52, 701, 702, 746–797

(56) References Cited

U.S. PATENT DOCUMENTS
6,000,006 A * 12/1999 Bruce et al. ............. 711/103
6,112,324 A * 8/2000 Howe et al. ............. 707/205

FOREIGN PATENT DOCUMENTS
EP 0 366 402 5/1990
EP 0 617 565 9/1994

OTHER PUBLICATIONS
Patent Abstracts of Japan vol. 17, No. 550, Oct. 4, 1993, JP 05 151709.

* cited by examiner

Primary Examiner—Matthew Kim
Assistant Examiner—Woo H. Choi
(74) Attorney, Agent, or Firm—Frommer Lawrence & Haug LLP; William S. Frommer; Darren M. Simon

(57) ABSTRACT

A shuffling table memory has a shuffling table written from an external memory through a path. The external memory stores a plurality of shuffling tables corresponding to the formats of video data to be shuffled. One shuffling table selected according to the result of format determination is stored in the shuffling table memory. The shuffling table memory receives an IDi separated from the input data as an address and outputs a converted address IDo. The address IDo generated by the shuffling table memory is used as a write address for writing data into a data-accumulation memory. With the read address sequentially changing, shuffled data is read from the data accumulation memory.

4 Claims, 16 Drawing Sheets

HEAD TRACE DIRECTION

FIG. 6A

| | ID0 | ID1 |
|---|---|---|
| MSB 7 | SYNC ID7 | UPPER / LOWER |
| 6 | SYNC ID6 | (RESERVED) |
| 5 | SYNC ID5 | SEG NB3 |
| 4 | SYNC ID4 | SEG NB2 |
| 3 | SYNC ID3 | SEG NB1 |
| 2 | SYNC ID2 | SEG NB0 |
| 1 | SYNC ID1 | TRACK |
| LSB 0 | SYNC ID0 | VIDEO / AUDIO |

FIG. 6B

| DID (VIDEO) |
|---|
| (RESERVED) |
| (RESERVED) |
| (RESERVED) |
| (RESERVED) |
| PAYLOAD MD1 |
| PAYLOAD MD0 |
| 2MB / 1MB |
| Vouter |

FIG. 6C

| DID (AUDIO) |
|---|
| (RESERVED) |
| (RESERVED) |
| (RESERVED) |
| (RESERVED) |
| DATA / AUDIO |
| 5F Seg2 |
| 5F Seg1 |
| 5F Seg0 |

FIG. 16
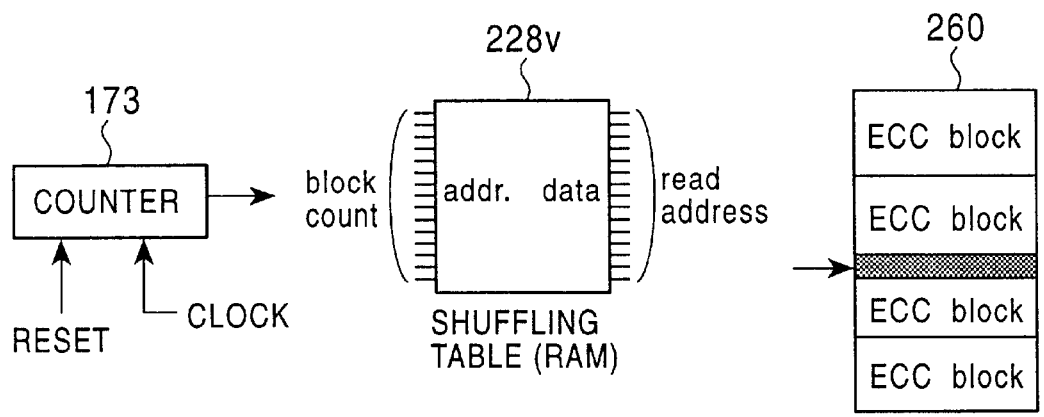
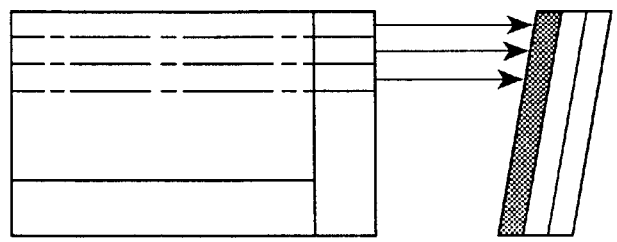
FIG. 17A
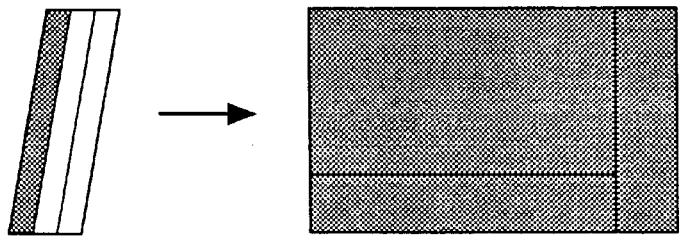
FIG. 17B

DATA PROCESSING APPARATUS AND DATA RECORDING APPARATUS

BACKGROUND OF THE INVENTION

1. Field of the Invention

The present invention relates to data processing apparatuses and data recording apparatuses, for recording image data, for example, into a tape-shaped recording medium and for reproducing the image data from the recording medium.

2. Description of the Related Art

As typically represented by a digital video cassette recorder (VCR), data recording and reproduction apparatuses for recording a digital image signal into a magnetic tape and for reproducing from the recording medium are known. In a recording processing section of a digital image recording unit, processing called shuffling for rearranging data in an order different from the original order is performed. Shuffling is performed for the following reasons.

Firstly, shuffling is performed to disperse a burst error due to a scratch on the tape in order to increase immunity against an error in an error correcting code (ECC) block. As the ECC, a product code is employed in many cases. The product code is obtained by applying external-code encoding to two-dimensional video data or audio data in the vertical direction and by applying internal-code encoding in the horizontal direction to encode the data symbols doubly. A data set formed of data, external-code parities, and internal-code parities is called an ECC block.

As shown in FIG. 17A, data in one ECC block is recorded into one track in a helical-scanning VCR. An extremely large number of errors may occur in the data in this track due to a head clog in the helical-scanning VCR as shown in FIG. 17B by shadows. In this case, the errors cannot be corrected with the error correcting capacity of the ECC and the whole ECC block data cannot be reproduced.

On the other hand, when data in one ECC block is shuffled and recorded in a plurality of tracks as shown in FIG. 18A, even if a burst error occurs in the whole track as shown in FIG. 18B, the burst error is dispersed by the processing (deshuffling) reverse to shuffling in reproduction processing and thereby the error is suppressed in one ECC block such that it can be corrected. Assuming that the direction of an internal code matches a recording and reproduction direction, a burst error is corrected by an external code at a high possibility.

Secondly, a shuffling operation is performed to allow a concealment process to be performed to make otherwise uncorrectable errors less conspicuous to the viewer. In other words, when error correcting fails, an interpolated image is generated with the use of spatial redundancy or time redundancy of an image in error conceal processing. The distribution of pixels which cannot be reproduced due to a burst error is controlled in shuffling to make a condition appropriate for concealing. With a combination of shuffling and concealing, a reproduced image is made easier to see when error correcting fails.

FIGS. 19A and 19B show a second advantage of shuffling. FIG. 19A shows a condition in which a loss of one track is dispersed on the screen by the use of shuffling. FIG. 19B shows a condition in which a loss of one track is collectively placed at a part of the screen by shuffling. One of these two types of shuffling is selected according to whether the data to be recorded is compressed data or non-compressed data. The condition shown in FIG. 19A is effective for non-compressed video data. The condition shown in FIG. 19B is effective for compressed video data. Effectiveness differs depending on whether an error concealing method uses surrounding correct pixels to interpolate an error pixel in the space domain or uses correct data in the preceding frame to interpolate an error pixel in the time domain.

Thirdly, shuffling is performed to make a reproduced image easier to see in a speed-change reproduction, in which a reproduction operation is performed at a tape speed different from that used in recording. Since the head scans a tape over a plurality of tracks in the speed-change reproduction, reproduced image data is fragmentarily collected from a plurality of tracks. Depending on a tape speed in a speed-change reproduction, image data which can be fragmentarily reproduced and image data which cannot be fragmentarily reproduced may be fixed in position on the screen. In this case, a part of the image is not updated in a speed-change reproduction, and thereby the contents of the reproduced image are difficult to understand. Shuffling can prevent this problem.

FIGS. 20A and 20B show a third advantage of shuffling. As shown in FIG. 20A, image data recorded into a part of a track is dispersed on the screen by shuffling. Conversely, image data recorded into a part of a track may be collectively placed at a portion on the screen as shown in FIG. 20B. In the same way as in the description of the second advantage of shuffling, which shuffling method is effective depends on a data condition, compressed or non-compressed. In other words, the method shown in FIG. 20A is effective for non-compressed video data. The method shown in FIG. 20B is effective for compressed video data.

As described above, shuffling is an effective method for improving reproduced-image quality when a tape-shaped recording medium is used. Which shuffling form (hereinafter called shuffling pattern) is employed is determined with all of an input-image format, the structure of an ECC block, and a recording format on a tape being taken into account. Conventionally, a shuffling pattern is represented by an appropriate expression and a calculation circuit for performing the processing of the expression is mounted.

In environments where digital broadcasting has been developed, a number of types of video and audio formats (each including a field frequency, the number of lines, interlaced scanning/progressive scanning, a screen size, and an aspect ratio) are used. Therefore, it is expected that a digital VCR handles a plurality of video and audio formats. In a conventional digital VCR, however, when an input-image format or a recording data rate is changed, a shuffling circuit for performing most appropriate shuffling is required to be designed again and mounted. The VCR lacks flexibility in handling a plurality of formats.

SUMMARY OF THE INVENTION

Accordingly, it is an object of the present invention to provide a data processing apparatus and a data recording apparatus which allow shuffling processing appropriate for each of a plurality of input-data formats to be performed.

The foregoing object is achieved in one aspect of the present invention through the provision of a data processing apparatus for rearranging digital information data in an order different from the original order, including a shuffling table memory for storing a shuffling table, for receiving positional information indicating the position of a data unit in an input-data sequence as an address, and for outputting converted positional information obtained by converting the positional information according to the shuffling table; and means for storing a shuffling table selected from a plurality of shuffling tables into the shuffling table memory.

The foregoing object is achieved in another aspect of the present invention through the provision of a data recording apparatus for rearranging digital information data in an order different from the original order and for recording the rearranged digital information data into a tape-shaped recording medium, including a data accumulation memory for accumulating digital information data; a shuffling table memory for storing a shuffling table, for receiving positional information indicating the position of a data unit in an input-data sequence as an address, and for outputting a write or read address of the data accumulation memory by converting the positional information according to the shuffling table; means for storing a shuffling table selected from a plurality of shuffling tables in the shuffling table memory; an error correcting encoder for applying error-correcting-code encoding to at least one of the input data and the output data of the data accumulation memory; and recording means for recording the data error-correcting encoded by the error correcting encoder into a tape-shaped recording medium.

One of a plurality of shuffling tables is selected according to the format of input digital information data (video data and/or audio data). Therefore, input digital information data having a plurality of formats can be shuffled. Since a shuffling pattern is provided as a table, shuffling more complicated than that represented by an expression can be provided, and thereby error immunity is improved. Successful error concealing is possible. In addition, image quality in speed-change reproduction can be improved.

BRIEF DESCRIPTION OF THE DRAWINGS

FIGS. 6A, 6B, and 6C show the contents of IDs and DIDs added to a sync block.

FIG. 16 is a block diagram showing a structure of a shuffling section employing a memory-read-address control method in a case in which the section is applied to a digital VCR.

FIGS. 17A and 17B show a case in which a number of errors occur.

DESCRIPTION OF THE PREFERRED EMBODIMENT

Figure 1:
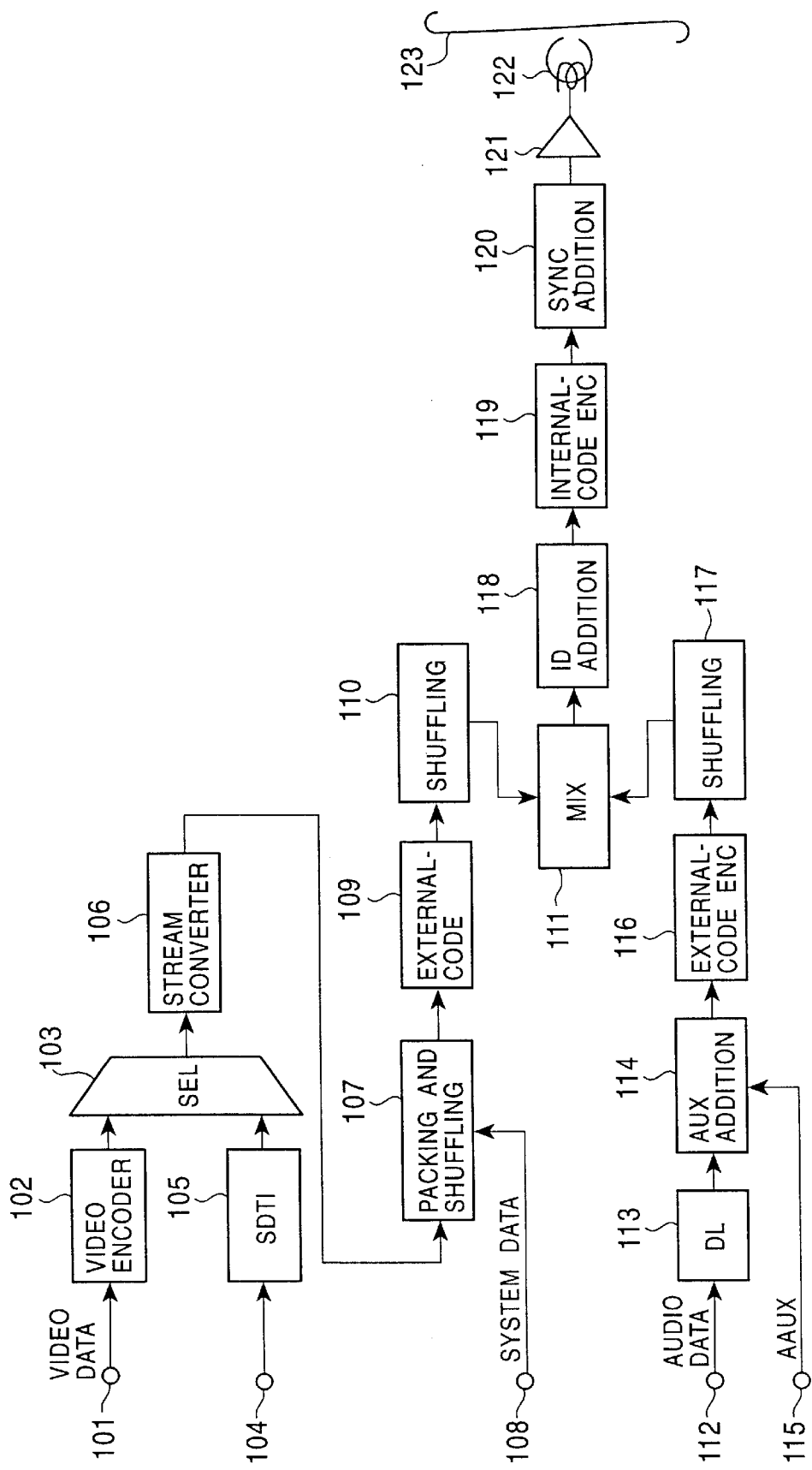
FIG. 1 is a block diagram of the recording side of a recording and reproduction apparatus according to an embodiment of the present invention.

An embodiment in which the present invention is applied to a digital VCR will be described below. This embodiment is suitable for an environment of a broadcasting station and allows video signals having a plurality of formats different from each other to be recorded and reproduced. For example, both of a signal (480i signal) having an effective line count of 480 in interlaced scanning based on the NTSC system and a signal (576i signal) having an effective line count of 576 in interlaced scanning based on the PAL system can be recorded and reproduced with hardware almost not changed. In addition, it is made possible that a signal (1080i signal) having a line count of 1080 in interlaced scanning and signals (480p signal, 720p signal, and 1080p signal) having line counts of 480, 720, and 1080 in progressive (non-interlaced) scanning are recorded and reproduced.

In this embodiment, video signals and audio signals are compression-encoded according to the Moving-Picture-Experts-Group-Phase-2 (MPEG2) method. As is generally known, MPEG2 is a combination of motion-compensation predictive encoding and compression encoding by the use of discrete cosine transform (DCT). MPEG2 data has a hierarchical structure and includes, from a lower layer, a block layer, a macroblock layer, a slice layer, a picture layer, a group-of-pictures (GOP) layer, and a sequence layer.

The block layer is formed of a DCT block, which serves as a unit to which DCT is applied. The macroblock layer is formed of a plurality of DCT blocks. The slice layer includes a header section and any number of macroblocks which are not extended over a line boundary. The picture layer is formed of a header section and a plurality of slices. A picture corresponds to one screen. The GOP layer includes a header section, an intra-coded picture (I picture) based on intraframe encoding, and a predictive-coded picture (P picture) and a bidirectionally predictive-coded picture (B picture) based on predictive encoding.

The I picture is obtained by the use of information closed in the picture. Therefore, it can be decoded only with the information of the I picture itself. The P picture is obtained by the use of an I picture or a P picture positioned previously in the time domain and already decoded as a predictive picture (a reference picture for difference). Whichever is more efficient of encoding of the difference with a predictive picture for which motion-compensation has been applied and encoding without obtaining a difference is selected in units of macroblocks. The B picture is obtained by the use of three types of pictures, an I picture or a P picture positioned previously in the time domain and already decoded, an I picture or a P picture positioned subsequently in the time domain and already decoded, and an interpolated picture generated by the use of both, as predictive pictures (reference pictures for difference). Whichever is most efficient of encoding of a difference after motion compensation and intra-encoding for the three types of pictures is selected in units of macroblocks.

Therefore, macroblocks include intra-frame coded macroblocks, forward inter-frame predictive macroblocks, in which the future is predicted from the past, backward inter-frame macroblocks, in which the past is predicted from the future, and bidirectional macroblocks, in which a bidirectional prediction is performed. All macroblocks in an I picture are intra-frame coded macroblocks. A P picture includes intra-frame coded macroblocks and forward inter-frame predictive macroblocks. A B picture includes macroblocks of the four types described above.

A GOP includes at least one I picture and is allowed to not include a P picture or a B picture. The sequence layer, which is the highest layer, is formed of a header section and a plurality of GOPs.

In the MPEG format, a slice is one variable-length code sequence. In a variable-length code sequence a data boundary cannot be detected without decoding a variable-length code.

At the top of each of a sequence layer, a GOP layer, a picture layer, a slice layer, and a macroblock layer, an identification code (called a start code) having a predetermined bit pattern arranged in units of bytes is disposed. The header section of each layer described above collectively includes a header, and extended data or user data. The header of a sequence layer includes the size (the numbers of pixels in the horizontal and vertical directions) of a picture. The header of a GOP layer includes a time code and the number of pictures constituting the GOP.

A macroblock included in a slice layer is a collection of a plurality of DCT blocks. A coded sequence of a DCT block is obtained by applying variable-length encoding to a sequence of quantized DCT coefficients with the number of times (run) a zero coefficient is successive and a non-zero sequence (level) immediately thereafter being handled as a unit. An identification code arranged in byte units is not attached to a macroblock or a DCT block in a macroblock. In other words, a macroblock or a DCT block is not a variable-length coded sequence.

A macroblock is obtained by dividing a picture into 16-pixel-by-16-line lattice-shaped blocks. A slice is formed, for example, by connecting macroblocks in the horizontal direction. The last macroblock of a slice is continuous with the first macroblock of the next slice among the continuous slices. Overlapping of macroblocks between slices is not allowed. When the size of a screen is determined, the number of macroblocks per a screen is uniquely determined.

It is preferable that editing be performed on encoded data to avoid signal deterioration caused by decoding and encoding. To decode a P picture or a B picture, a picture located previously in the time domain or previous and subsequent pictures are required. Therefore, an editing unit cannot be set to one frame. With this point being taken into account, one GOP is formed of one I picture in the present invention.

For example, a recording area for recording recording data of one frame is set to a predetermined recording area. Since variable-length encoding is used in MPEG2, the amount of data generated in one frame is controlled such that the data generated in one frame can be recorded into the predetermined recording area. In addition, to make recording into a magnetic tape suitable, one slice is formed of one macroblock and one macroblock is placed in a fixed frame having a predetermined length in the present embodiment.

FIG. 1 is a view showing a structure of the recording side of a recording and reproduction apparatus according to the embodiment. During recording, a digital video signal is input to a terminal 101 through a predetermined interface, such as the receiving section of a serial data interface (SDI). The SDI is an interface defined by SMPTE in order to transmit a 4:2:2 component video signal, a digital audio signal, and additional data. In a video encoder 102, an input video signal receives DCT (discrete cosine transform) processing and is converted to coefficient data, and the coefficient data is variable-length encoded. Variable-length coded (VLC) data output from the video encoder 102 is an elementary stream conforming to MPEG2. This output is sent to one of input ends of a selector 103.

Data having a serial data transport interface (SDTI) format is input to an input terminal 104. This interface is defined by ANSI/SMPTE 305M. This signal is synchronous-detected by an SDTI receiving section 105. It is temporarily stored in a buffer and an elementary stream is taken out. The taken-out elementary stream is input to the other input end of the selector 103.

An elementary stream selected and output from the selector 103 is sent to a stream converter 106. The stream converter 106 collects DCT coefficients arranged in each DCT block according to the MPEG2 specification, by their frequency components throughout a plurality of DCT blocks constituting one macroblock and rearranges the collected frequency components. The rearranged converted elementary stream is sent to a packing and shuffling section 107.

Since video data in an elementary stream has been variable-length encoded, the length of the data of each macroblock is not equal. The packing and shuffling section 107 places a macroblock into a fixed frame. A portion which cannot fit in the fixed frame is sequentially placed in a blank area in another fixed frame. System data such as a time code is sent from an input terminal 108 to the packing and shuffling section 107, and receives recording processing in the same way as for picture data. Shuffling is also performed in which macroblocks generated in the order of scanning in one frame are rearranged and the recording positions of the macroblocks on the tape are dispersed. With this shuffling, even when data is fragmentarily reproduced during speed-change reproduction, the updating rate of a picture is improved.

The packing and shuffling section 107 sends video data and system data (hereinafter data including system data is also called just video data except for a special case) to an external-code encoder 109. A product code is used as an error correcting code for video data and audio data. A product code is obtained by applying external-code encoding to two-dimensional video data or audio data in the vertical direction and by applying internal-code encoding in the horizontal direction to encode the data symbols doubly. A Reed-Solomon code can be used as an external code and an internal code.

The output of the external-code encoder 109 is sent to a shuffling section 110. Shuffling is performed there in which a plurality of ECC blocks are rearranged in units of sync blocks. Shuffling performed in units of sync blocks prevents errors from converging in a certain ECC block. Shuffling performed in the shuffling section 110 is also called interleaving. The output of the shuffling section 110 is sent to a mixing section 111 and mixed with audio data. The mixing section 111 is formed of a main memory as described later.

Audio data is input to an input terminal 112. Non-compressed digital audio signal is handled in the present embodiment. A digital audio signal is separated in the SDI receiving section (not shown) at the input side or in the SDTI receiving section 105, or is input through an audio interface. The input digital audio signal is sent to an AUX addition section 114 through a delay section 113. The delay section 113 is used for matching the timing between audio signal and video signal. Audio AUX input to an input terminal 115 is auxiliary data including information related to audio data, such as the sampling frequency of the audio data. The audio AUX is added to the audio data in the AUX addition section 114 and handled in the same way as for the audio data.

The audio data and the AUX (hereinafter data including AUX is also called just audio data except for a special case) output from the AUX addition section 114 is sent to an external-code encoder 116. The external-code encoder 116 applies external-code encoding to the audio data. The output of the external-code encoder 116 is sent to a shuffling section 117 and shuffling processing is applied. As audio shuffling, shuffling in units of sync blocks and shuffling in units of channels are performed.

The output of the shuffling section 117 is sent to the mixing section 111, and the video data and the audio data are mixed to form one-channel data. The output of the mixing section 111 is sent to an ID addition section 118. The ID addition section 118 adds an ID including information indicating a sync block number. The output of the ID addition section 118 is sent to an internal-code encoder 119, and internal-code encoding is executed. The output of the internal-code encoder 119 is sent to a synchronization addition section 120, and a synchronization signal is added to each sync block. With synchronization signals being added, recording data formed of continuous sync blocks is formed. This recording data is sent to a rotating head 122 through a recording amplifier 121 and recorded in a magnetic tape 123. The recording head 122 is actually a plurality of magnetic heads mounted on a rotating drum. The heads generate adjacent tracks and have different azimuths to each other.

Scrambling processing may be applied to recording data as required. Digital modulation may be performed in recording. A partial response class 4 and a Viterbi code may be further used.

Figure 2:
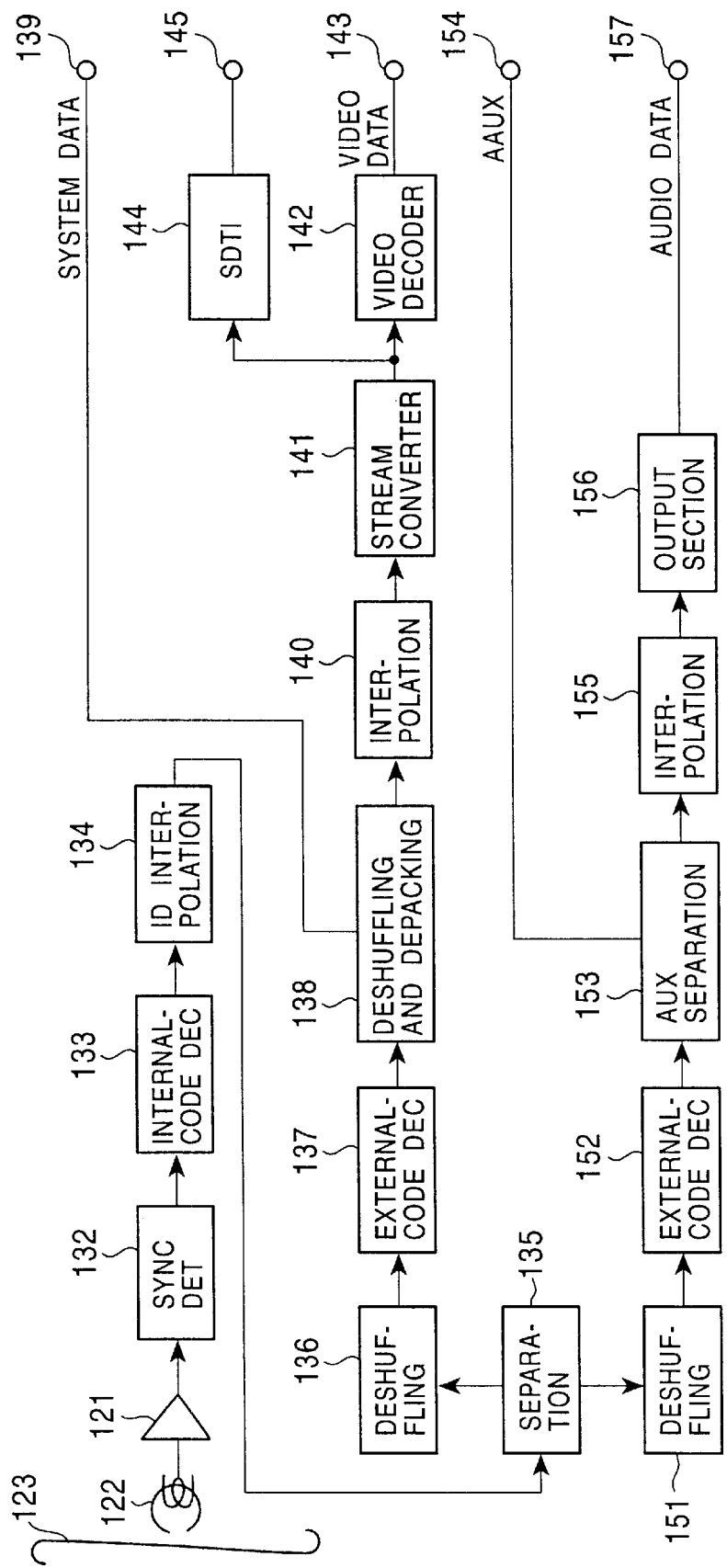
FIG. 2 is a block diagram of the reproduction side of the recording and reproduction apparatus according to the embodiment of the present invention.

FIG. 2 is a view showing a structure of the reproduction side according to the embodiment of the present invention. A reproduction signal reproduced from the magnetic tape 123 by the rotating head 122 is sent to a synchronization detecting section 132 through a reproduction amplifier 131. Equalization and waveform shaping are applied to the reproduction signal. In addition, demodulation of digital modulation and the Viterbi decoding are applied as required. The synchronization detecting section 132 detects a synchronization signal added to the top of a sync block. With synchronization detection, a sync block is taken out.

The output of the synchronization detecting section 132 is sent to an internal-code encoder 133, and error correcting is performed for an internal code. The output of the internal-code encoder 133 is sent to an ID interpolation section 134, and the ID of a sync block in which an error has been found by the internal code, such as the sync block number thereof, is interpolated. The output of the ID interpolation section 134 is sent to a separation section 135, and video data and audio data are separated. As described above, the video data includes the DCT coefficient data generated by intra-encoding of MPEG, and the system data. The audio data includes the PCM (pulse code modulation) data and the AUX.

The video data is sent from the separation section 135 to a deshuffling section 136, and the processing reverse to shuffling is applied. The deshuffling section 136 performs processing for restoring the data shuffled in units of sync blocks in the shuffling section 110 at the recording side. The output of the deshuffling section 136 is sent to an external-code decoder 137 and error correcting is performed for an external code. If an error which cannot be corrected occurs, an error flag indicating whether an error occurs shows that an error has happened.

The output of the external-code decoder 137 is sent to a deshuffling and depacking section 138. The deshuffling and depacking section 138 performs processing for restoring the data shuffled in units of macroblocks in the packing and shuffling section 107 at the recording side. The deshuffling and depacking section 138 also resolves the data packed in recording. In other words, the length of data is changed back in units of macroblocks to restore the original variable-length code. The deshuffling and depacking section 138 also separates the system data and sends it to an output terminal 139.

The output of the deshuffling and depacking section 138 is sent to an interpolation section 140, and data having an error flag (namely, error data) is corrected. In other words, when an error is detected in macroblock data before conversion, the DCT coefficients of frequency components after the error cannot be restored. Therefore, for example, the error data is replaced with a block end code (EOB) and the DCT coefficients of frequency components thereafter are set to zero. In the same way, during high-speed reproduction, only DCT coefficients having a length up to that corresponding to the sync block length are restored and coefficients thereafter are replaced with zero. In addition, in the interpolation section 140, when an error occurs at a header attached at the top of video data, processing for restoring the header (a sequence header, a GOP header, a picture header, and user data) is performed.

Since DCT coefficients are arranged in the order of DC components, lower-frequency components, and higher-frequency components in DCT blocks, even if DCT coefficients are ignored from a certain point, the DCT coefficients of DC components and lower-frequency components are uniformly distributed to each of DCT blocks constituting a macroblock.

The output of the interpolation section 140 is sent to a stream converter 141. The stream converter 141 performs the processing reverse to that performed by the stream converter 106 at the recording side. In other words, DCT coefficients arranged for each frequency component in DCT blocks are rearranged for each DCT block. With this operation, the reproduced signal is converted to an elementary stream conforming to MPEG2.

The stream converter 141 obtains a sufficient transmission rate (bandwidth) for its input and output according to the maximum length of a macroblock in the same way as for the recording side. When the length of a macroblock is not restricted, it is preferred that the bandwidth three times larger than a pixel rate be obtained.

The output of the stream converter 141 is sent to a video decoder 142. The video decoder 142 decodes the elementary stream to output video data. In other words, the video decoder 142 performs dequantization processing and inverse DCT processing. Decoded video data is sent to an output terminal 143. As an interface with the outside, for example, the SDI is used. The stream converter 141 also sends the elementary stream to an SDTI transmitting section 144. The SDTI transmitting section 144 also receives system data, reproduced audio data, and AUX although paths are not shown, and converts the stream to a stream having an SDTI-format data structure. The stream is output from the SDTI transmitting section 144 to the outside through an output terminal 145.

The audio data separated in the separation section 135 is sent to a deshuffling section 151. The deshuffling section 151 performs the processing reverse to shuffling performed by the shuffling section 117 at the recording side. The output of the deshuffling section 151 is sent to an external-code decoder 152, and error correcting is performed with an external code. The external-code decoder 152 outputs audio data for which error correcting has been applied. For data having an error which cannot be corrected, an error flag is set.

The output of the external-code decoder 152 is sent to an AUX separating section 153, and the audio AUX is separated. The separated audio AUX is sent to an output terminal 154. The audio data is sent to an interpolation section 155. The interpolation section 155 interpolates a sample having an error. Average-value interpolation, in which interpolation is performed by the use of the average of correct data placed previously and subsequently in the time domain, or previous-value holding, in which a correct sample value placed previously is held, can be used as an interpolation method. The output of the interpolation section 155 is sent to an output section 156. The output section 156 performs mute processing for disabling the output of an erroneous audio signal which cannot be interpolated and delay adjustment processing for matching the timing with that of the video signal. The output section 156 sends the reproduced audio signal to an output terminal 157.

Being omitted in FIG. 1 and FIG. 2, a timing generation section for generating a timing signal synchronized with an input data, a system controller (microcomputer) for controlling the operations of the whole recording and reproduction apparatus, and other sections are provided.

In the present embodiment, a signal is recorded into a magnetic tape in a helical scanning method, in which tracks are formed at an angle by magnetic heads mounted on the rotating head. A plurality of the magnetic heads are disposed at positions opposing each other on the rotating drum. In other words, when a magnetic tape is wound on the rotating head with a winding angle of about 180 degrees, a plurality of tracks are formed at the same time by a 180-degree rotation of the rotating head. A pair of magnetic heads has different azimuths. A plurality of magnetic heads are disposed such that azimuths are different for adjacent tracks.

Figure 3:
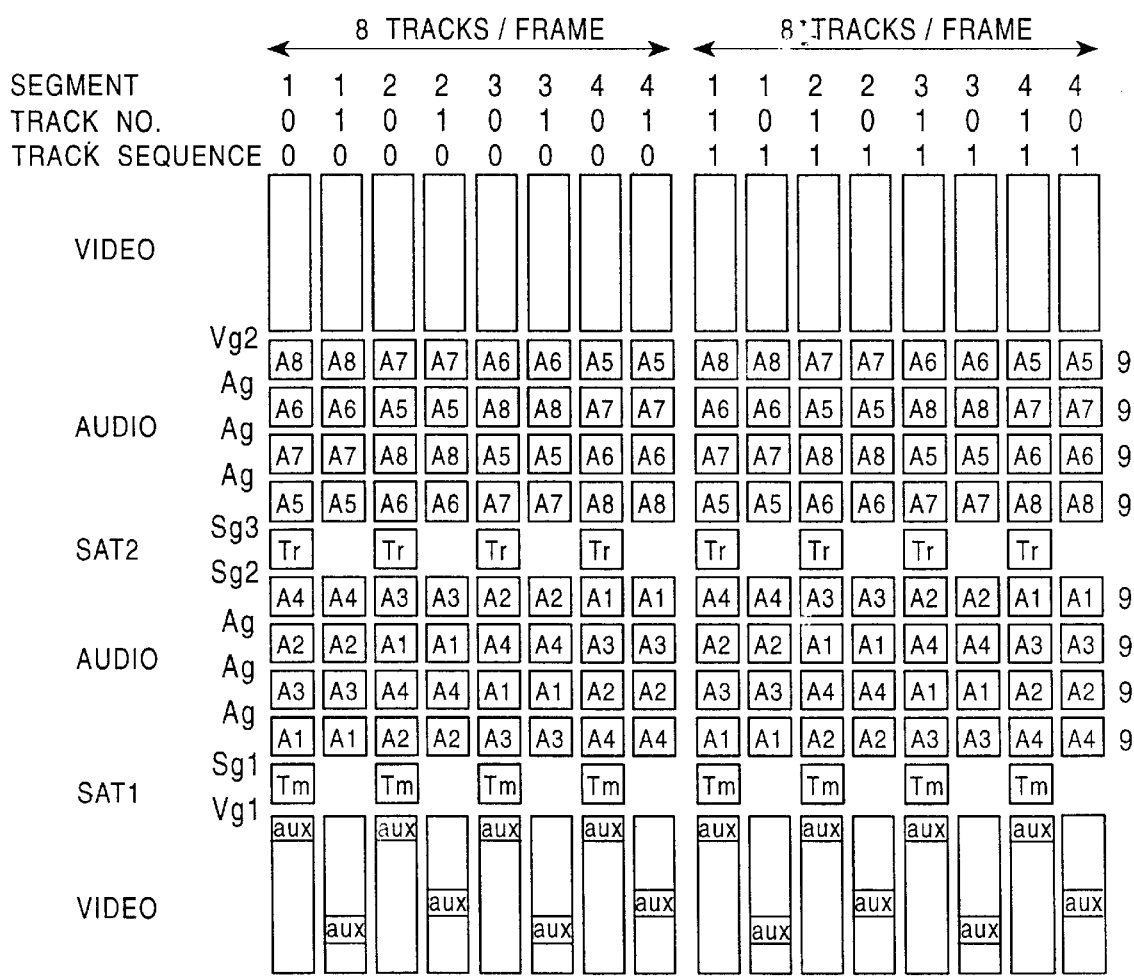
FIG. 3 is a view showing an example track format.

FIG. 3 shows an example format of tracks formed on a magnetic tape by the rotating head. In this example, video data and audio data are recorded in eight tracks per frame. For example, an interlaced signal (480i signal) having a frame frequency of 29.97 Hz, a rate of 50 Mbps, an effective line count of 576, and an effective horizontal pixel count of 720 and its audio signal are recorded. An interlaced signal (576i signal) having a frame frequency of 25 Hz, a rate of 50 Mbps, an effective line count of 576, and an effective horizontal pixel count of 720 and its audio signal can also be recorded in the same tape format as that shown in FIG. 3.

One segment is formed of two tracks having different azimuths. Therefore, eight tracks have four segments. Track numbers [0] and [1] corresponding to azimuths are assigned to one pair of tracks, which forms one segment. In the example shown in FIG. 3, the order of track numbers is switched between the first eight tracks and the second eight tracks, and a different track sequence is assigned to each frame. With these configuration, even if data cannot be read from one of a pair of magnetic heads having different azimuths due to clogging, the effect of an error is made small with the use of data in the preceding frame.

In each track, video sectors for recording video data are disposed at both ends, and audio sectors for recording audio data are disposed therebetween. FIG. 3 and FIG. 4, described later, show the arrangement of the audio sector on the tape.

Eight-channel audio data can be handled in the track format shown in FIG. 3. Sectors for a channel 1 to a channel 8 of audio data are represented by A1 to A8. Audio data is recorded with its arrangement being changed in units of segments. Audio data (having 800 or 801 samples at a field frequency of 29.97 Hz and a sampling frequency of 38 kHz) generated in one field period is divided into even-numbered samples and odd-numbered samples, and one ECC block of product codes is formed of each sample group and AUX.

Since data of one field is recorded in four tracks in FIG. 3, two ECC blocks for one channel of audio data are recorded in four tracks. Data (including external-code parities) in two ECC blocks are divided into four sectors, and dispersed and recorded into four tracks as shown in FIG. 3. A plurality of sync blocks included in two ECC blocks are shuffled. For example, two ECC blocks of the channel 1 are formed of four sectors having a reference number A1.

In this example, video data in four ECC blocks is shuffled (interleaved) for one track, and divided and recorded in each sector at the upper side and at the lower side. In a video sector in the lower side, a system area is provided at a predetermined position.

In FIG. 3, there are also shown areas SAT1 (Tr) and SAT2 (Tm) for recording servo lock signals. Between recording areas, gaps (Vg1, Sg1, Ag, Sg2, Sg3, and Vg2) having predetermined sizes are provided.

Figure 4A:
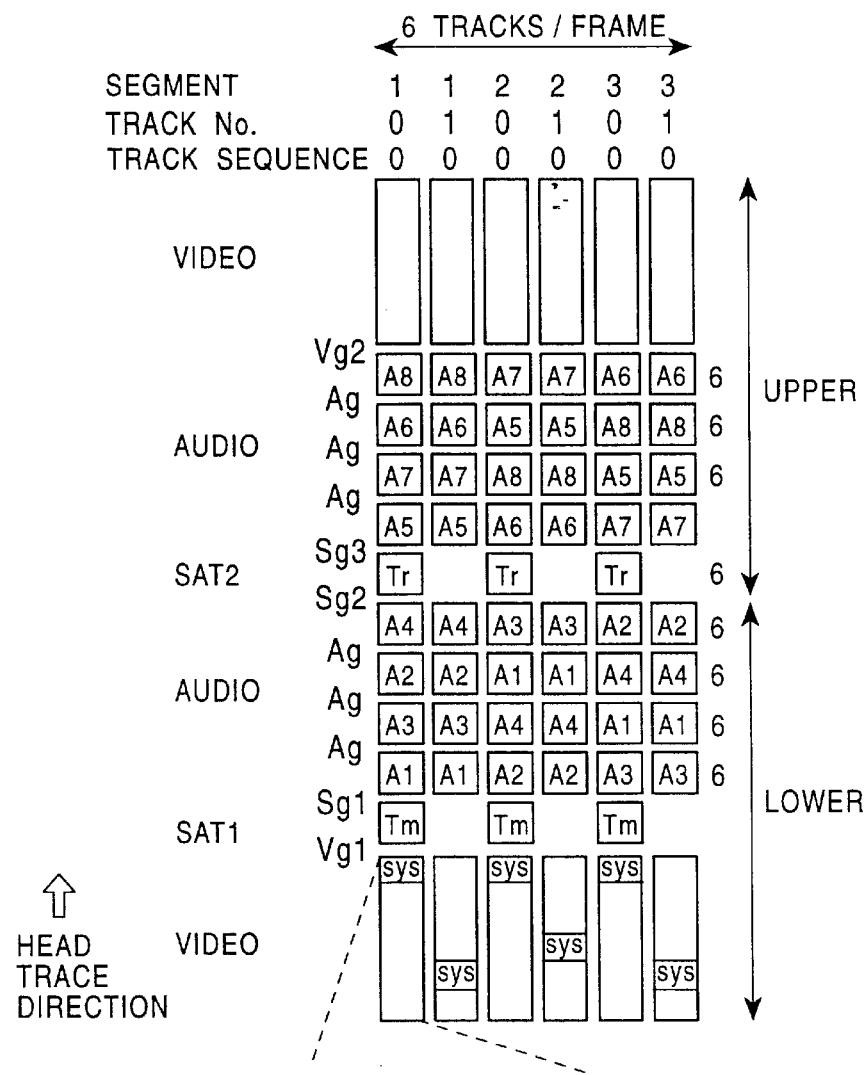
FIG. 4 is a view showing another example track format.

Data in one frame is recorded into eight tracks in FIG. 3. Depending on a format of data to be recorded and reproduced, data in one frame can be recorded in four tracks or six tracks. FIG. 4A shows a format in which one frame is formed of six tracks. In this example, a track sequence is set to [0] only.

Figure 4B:
Figure 4C:
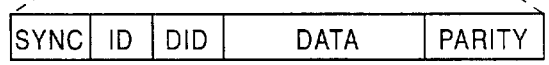

As shown in FIG. 4B, data recorded on a tape is formed of a plurality of blocks called sync blocks equally partitioned. FIG. 4C roughly shows a structure of a sync block. Details will be described later. A sync block is formed of a sync pattern for synchronous detection, an ID for identifying each sync block, a DID for indicating the contents of the followed data, a data packet, and an error correcting internal-code parity. Data is handled as a packet in units of sync blocks. In other words, the minimum unit of data to be recorded or reproduced is one sync block. A number of sync blocks are arranged (as shown in FIG. 4B) to form, for example, a video sector (shown in FIG. 4A).

FIG. 5 more specifically shows a data structure of a sync block in video data, which serves as the minimum unit of recording/reproduction. In this embodiment, data (VLC data) in one or two macroblocks is stored in one sync block according to the format of video data to be recorded, and the length of one sync block is changed according to the format of a video signal. As shown in FIG. 5A, one sync block includes, from the top, a two-byte sync pattern, a two-byte ID, a one-byte DID, a data area variably specified, for example, between 112 bytes and 206 bytes, and a 12-byte parity (internal-code parity). The data area is also called a payload.

The top two-byte sync pattern is used for synchronous detection, and has a predetermined bit pattern. The sync pattern, which matches the unique pattern, is detected to perform synchronous detection.

FIG. 6A shows an example of ID0 and ID1 bit assignment. An ID includes important information which the corresponding sync block uniquely has. Two bytes (ID0 and ID1) are assigned. The ID0 stores identification information (sync ID) for identify each sync block in one track. The sync ID is, for example, one of consecutive numbers assigned to sync blocks in each sector, and is expressed in eight bits. Sync IDs are assigned separately to a video sync block and to an audio sync block.

The ID1 stores information related to the track that includes the sync block. Assuming that bit 7 is assigned to the MSB and bit 0 is assigned to the LSB, bit 7 indicates that the sync block is disposed at the upper side or the lower side of the track, and bits 5 to 2 show the segment of the track. Bit 1 indicates the track number corresponding to the track azimuth, and bit 0 shows whether the sync block has video data or audio data.

FIG. 6B shows an example of DID bit assignment for video data. The DID stores information related to the payload. According to the value of bit 0 in the ID1, described above, namely, depending on whether the sync block has video data or audio data, the contents of the DID differ. Bits 7 to 4 are reversed. Bits 3 and 2 show a payload mode, such as a payload type. These bits are auxiliary. Bit 1 shows whether the payload stores one or two macroblocks. Bit 0 indicates whether video data stored in the payload has an external-code parity.

FIG. 6C shows an example of DID bit assignment for audio data. Bits 7 to 4 are reserved. Bit 3 indicates whether audio data or general data is stored in the payload. When compression-encoded audio data is stored in the payload, bit 3 has a value indicating data. Bits 2 to 0 store information of a five-field sequence in the NTSC system. In other words, in the NTSC system, an audio signal has 800 or 801 samples for a video signal of one field when the sampling frequency is 48 kHz, and the sequence is repeated in every five fields. Bits 2 to 0 show the current data position in the sequence.

Figure 5A:
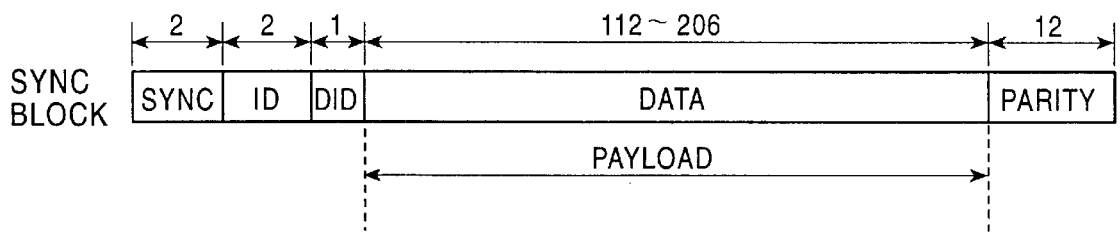
FIG. 5 is a view showing a plurality of examples of sync-block structures.
Figure 5B:
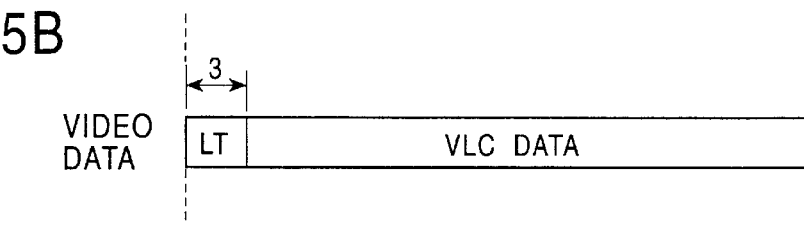
Figure 5C:
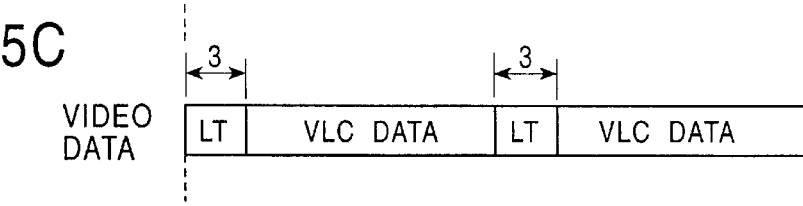

Back to FIG. 5, FIGS. 5B to 5E show examples of the above-described payload. FIGS. 5B and 5C show cases in which video data (variable-length encoded data) of one or two macroblocks is stored. In an example shown in FIG. 5B in which one macroblock is stored, length information LT indicating the length of the following macroblock is disposed in the top three bytes. The length information LT may include the length of itself. In an example shown in FIG. 5C in which two macroblocks are stored, the length information LT of a first macroblock is disposed at the top and then the first macroblock is disposed consecutively. Following the first macroblock, the length information LT of a second macroblock is disposed and then the second macroblock is disposed consecutively. The length information LT is required for debugging.

Figure 5D:
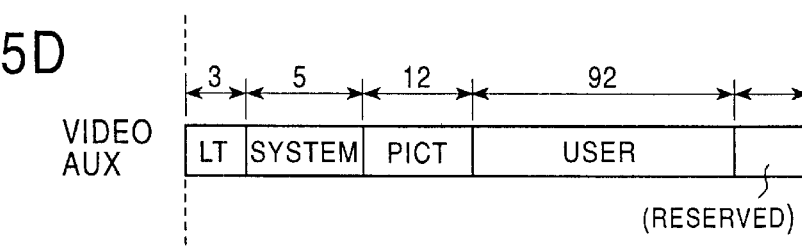

FIG. 5D shows a case in which AUX (auxiliary) video data is stored in the payload. Length information LT disposed at the top indicates the length of the AUX video data. Following this length information LT, five-byte system information, 12-byte PICT information, and 92-byte user information are stored. The remainder in the payload is reserved.

Figure 5E:
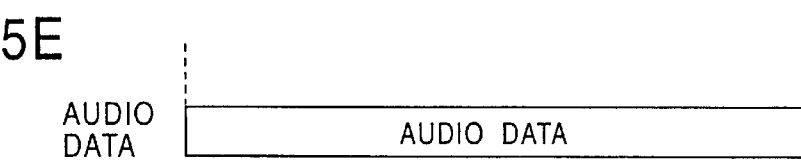

FIG. 5E shows a case in which audio data is stored in the payload. Audio data can be placed in the whole payload. An audio signal is handled in a form to which compression processing is not applied, such as a PCM form. Audio data which is compression encoded in a certain method may be handled, instead.

In the present embodiment, since the length of the payload, which serves as a data storage area in each sync block, is most suitably specified separately for a video sync block and an audio sync block, the blocks do not have the same payload length. In addition, the length of a sync block in which video data is recorded and the length of a sync block in which audio data is recorded are most suitably set according to the signal formats, respectively. With these settings, a plurality of different signal formats can be handled integratedly.

Figure 7A:
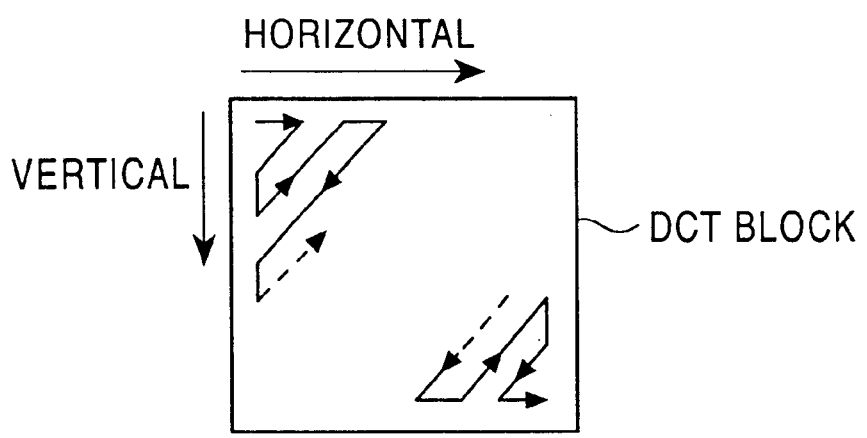
FIGS. 7A and 7B show an output method of a video encoder and variable-length encoding.
Figure 7B:
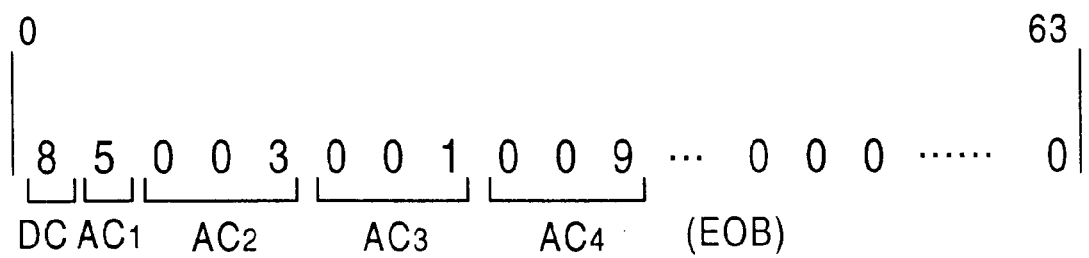

FIG. 7A shows the order of DCT coefficients in video data output from the DCT circuit of an MPEG encoder. In a DCT block, DCT coefficients are output in zigzag scanning from the DC component placed at the upper left corner toward the direction in which horizontal and vertical spatial frequencies become higher. As a result, as shown in an example of FIG. 7B, a total of 64 (eight pixels by eight lines) DCT coefficients are obtained in the order of their frequency components.

These DCT coefficients are variable-length encoded by the VLC section of the MPEG encoder. In other words, the first coefficient is fixed as the DC component, and codes are assigned to the other components (AC components) according to the zero runs and the following levels. Therefore, variable-length encoded outputs for the coefficient data of the AC components are arranged from the coefficient of a lower (lower-order) frequency component to the coefficient of a higher (higher-order) frequency component, $AC_1$, $AC_2$, $AC_3$, . . . . An elementary stream includes variable-length encoded DCT coefficients.

The stream converter 106 rearranges the DCT coefficients of the received signal. The DCT coefficients arranged in the order of frequency components in each DCT block by zigzag scanning in each macroblock are rearranged in the order of frequency components over the DCT blocks constituting each macroblock.

Figure 8A:
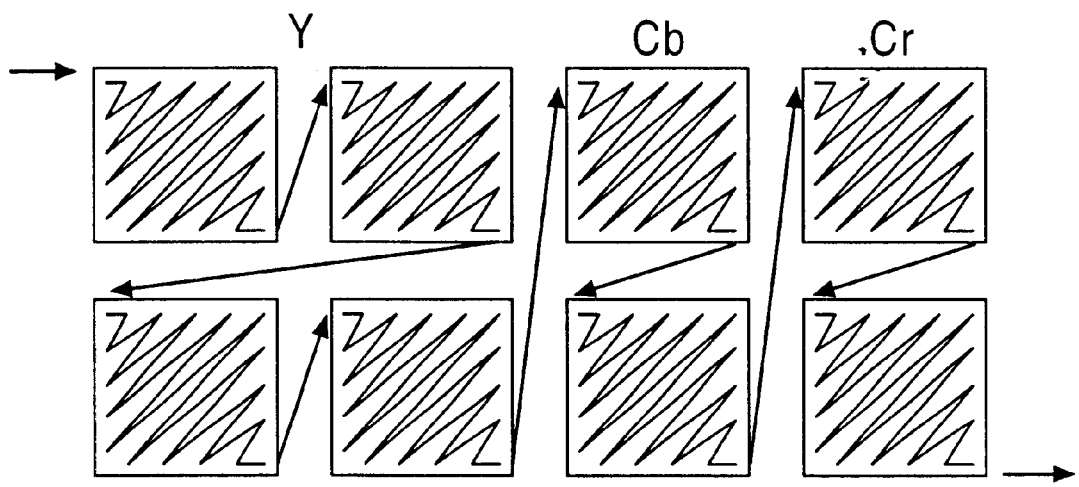
FIGS. 8A and 8B show rearrangement of the order of a video-encoder output.
Figure 8B:
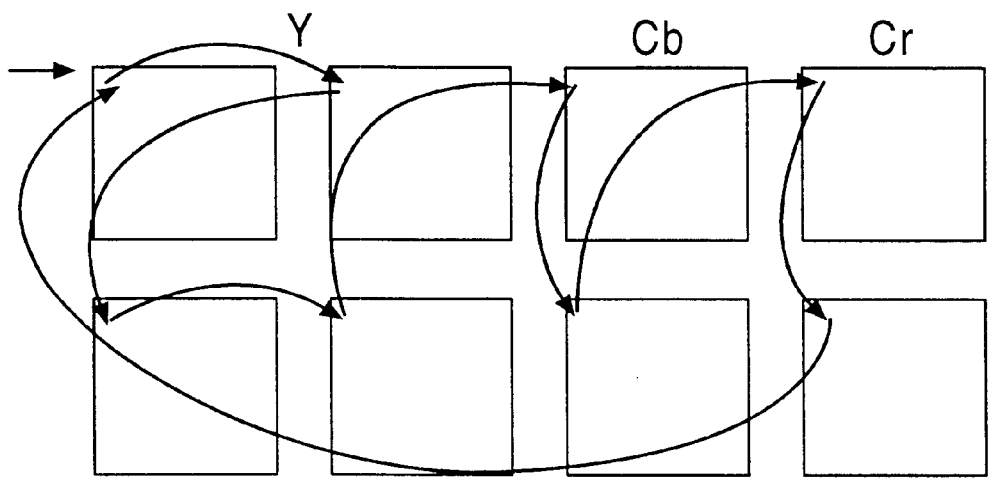

FIGS. 8A and 8B roughly show DCT-coefficient rearrangement in the stream converter 106. One macroblock is formed of four DCT blocks ($Y_1$, $Y_2$, $Y_3$, and $Y_4$) for a luminance signal Y, and two DCT blocks ($Cb_1$, $Cb_2$, $Cr_1$, and $Cr_2$) for each of chrominance signals Cb and Cr in a 4:2:2 component signal.

As described above, zigzag scanning is performed in the video encoder 102 according to the MPEG2 specification. DCT coefficients are arranged in the order of frequency components from the DC component, lower-frequency components to higher-frequency components in each DCT block as shown in FIG. 8A. After one DCT block is scanned, the next DCT block is scanned and its DCT coefficients are arranged in the same way.

In other words, in a macroblock, the DCT coefficients of the DCT blocks $Y_1$, $Y_2$, $Y_3$, and $Y_4$, and the DCT blocks $Cb_1$, $Cb_2$, $Cr_2$, and $Cr_2$ are arranged in the order of frequencies, from the DC component, lower-frequency components to higher-frequency components. Variable-length encoding is performed such that DC, $AC_1$, $AC_2$, $AC_3$, . . . and their signs are assigned to pairs of consecutive runs and the following levels.

The stream converter 106 detects the boundaries of the variable-length encoded and arranged DCT coefficients by analyzing variable-length codes, and collects them for each frequency component over DCT blocks constituting the macroblock. FIG. 8B shows this operation. The coefficient data is rearranged over the eight DCT blocks such that the DC components in the eight DCT blocks of the macroblock are collected first, the lowest-frequency AC coefficient components in the eight DCT blocks are collected next, and then AC coefficients having the same orders are collected sequentially.

The rearranged coefficient data is formed of DC ($Y_1$), DC($Y_2$), DC($Y_3$), DC($Y_4$), DC($Cb_1$), DC($Cb_2$), DC($Cr_1$), $DC(Cr_2)$, $AC_1(Y_1)$, $AC_1(Y_2)$, $AC_1(Y_3)$, $AC_1(Y_4)$, $AC_1(Cb_1)$, $AC_1(Cb_2)$, $AC_1(Cr_1)$, $AC_1(Cr_2)$, . . . , where DC, $AC_1$, $AC_2$, . . . represent variable-length codes assigned to pairs of a run and the following level as described above by referring to FIGS. 7A and 7B.

The converted elementary stream in which the coefficient data is rearranged in the stream converter 106 is sent to the packing and shuffling section 107. The data length of a macroblock is the same between the converted elementary stream and the elementary stream before conversion. Even when the video encoder 102 makes data have a fixed length in each GOP (one frame) by bit rate control, the length varies in units of macroblocks. The packing and shuffling section 107 applies a fixed frame to macroblock data.

Figure 9A:
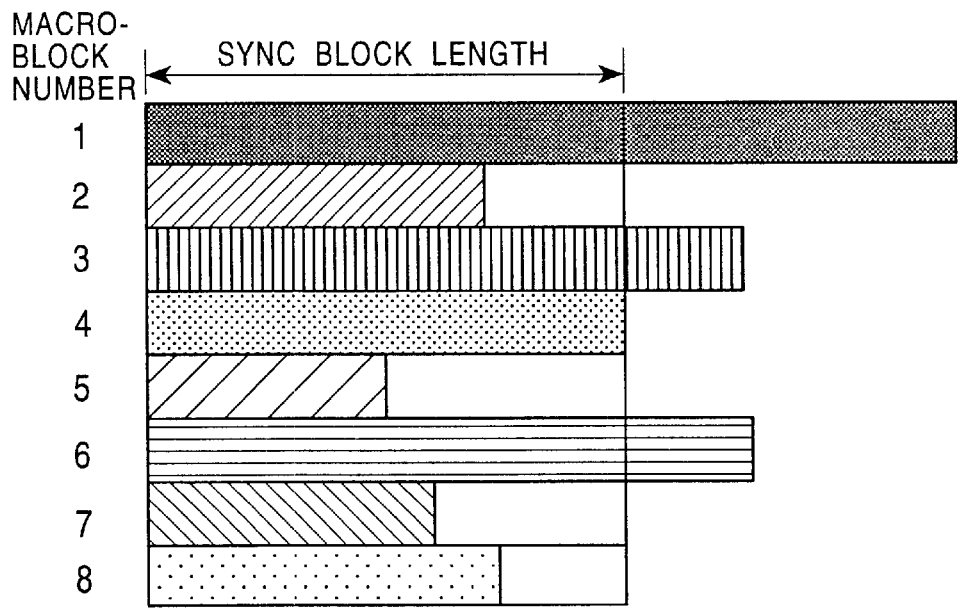
FIGS. 9A and 9B show processing for packing rearranged-order data into a sync block.
Figure 9B:
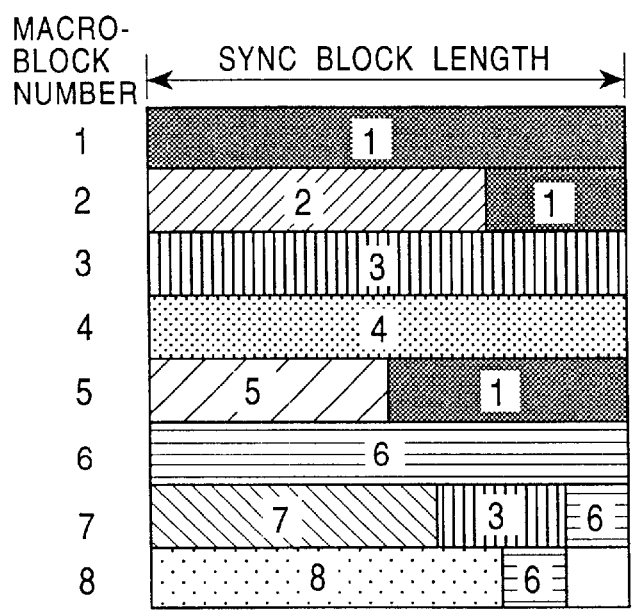

FIGS. 9A and 9B roughly show packing processing for macroblocks performed in the packing and shuffling section 107. Macroblocks are packed so as to fit in a fixed frame having a predetermined data length. The data length of the used fixed frame matches the length of a sync block, which serves as the minimum data unit in recording and reproduction. This is because shuffling and error correcting encoding are easily performed. In FIGS. 9A and 9B, it is assumed that one frame includes eight macroblocks for simplicity.

Eight macroblocks have different lengths due to variable-length encoding as shown in FIG. 9A. In this example, data in a macroblock #1, data in a macroblock #3, and data in a macroblock #6 are longer in length than one sync block, which is the fixed frame, and data in a macroblock #2, data in a macroblock #5, data in a macroblock #7, and data in a macroblock #8 are shorter in length. Data in a macroblock #4 has almost the same length as in one sync block.

With the packing processing, macroblocks are packed in fixed-length frames each having one sync block length. Data is packed without any lack or excess because the amount of data generated in one frame is controlled to be a fixed amount. A macroblock longer than one sync block is divided at a position corresponding to the sync block length as shown in FIG. 9B. In the divided macroblock, a portion (overflow portion) which extends from the sync block length is packed into an open area(s) from the top, namely, after a macroblock whose length does not reach the sync block length.

In the example shown in FIG. 9B, a portion of the macroblock #1, extended over the sync block length is packed after the macroblock #2 first. When the sync block length is reached, the remaining portion is packed after the macroblock #5. Then, a portion of the macroblock #3, extended over the sync block length is packed after the macroblock #7. Next, a portion of the macroblock #6, extended over the sync block length is packed after the macroblock #7 first, and then after the macroblock #8. Each macroblock is packed into the fixed frame having the sync block length in this way.

The length of each macroblock can be checked in advance by the stream converter 106. With this checking, the packing and shuffling section 107 understands the tail of each macroblock data without checking the contents of VLC data by decoding.

Figure 10A:
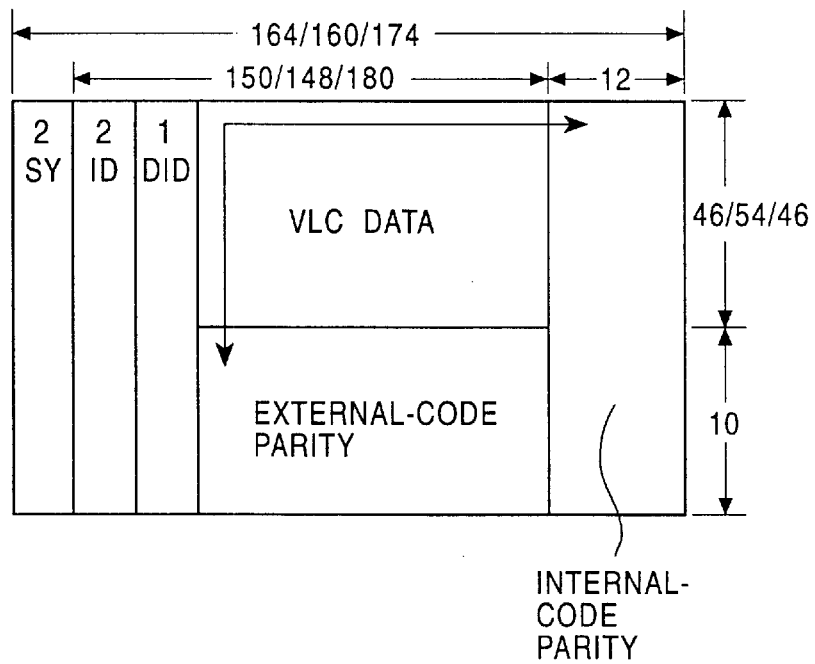
FIGS. 10A and 10B show error correcting codes for video data and audio data.
Figure 10B:
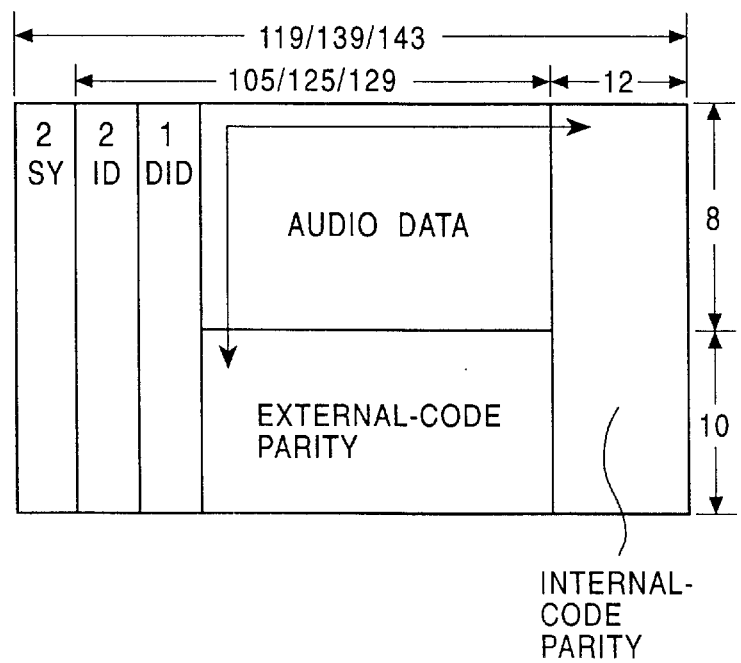

FIGS. 10A and 10B show example error correcting codes used in the present embodiment. FIG. 10A illustrates one ECC block of error correcting codes for video data, and FIG. 10B shows one ECC block of error correcting codes for audio data. VLC data shown in FIG. 10A is output from the packing and shuffling section 107. A sync pattern, an ID, and a DID are added to each row of the VLC data and an internal-code parity is further added to form one sync block.

More specifically, 10-byte external-code parities are generated from a predetermined number of symbols (bytes) arranged in the vertical direction of the VLC data array, and internal-code parities are generated from a predetermined number of symbols (bytes) in an ID, a DID, and VLC data (or external-code parities) arranged in the horizontal direction. In the example shown in FIG. 10A, 10 external-code-parity symbols and 12 internal-code-parity symbols are added. Specifically, the Reed-Solomon code is used as an error correcting code. The VLC data in one sync block shown in FIG. 10A has different lengths in order to handle different video-data frame frequencies, such as 59.94 Hz, 25 Hz, and 23.976 Hz.

In the same way as for video data, 10 external-code-parity symbols and 12 internal-code-parity symbols are generated as product codes for audio data as shown in FIG. 10B. The sampling frequency of audio data is, for example, set to 48 kHz and one sample is quantized by 24 bits. One sample may be converted to 16 bits or another number of bits. According to differences in the frame frequency described above, the amount of audio data in one sync block varies. As described above, audio data in one field for one channel forms two ECC blocks. One ECC block includes even-numbered or odd-numbered audio samples and AUX audio data.

Figure 11:
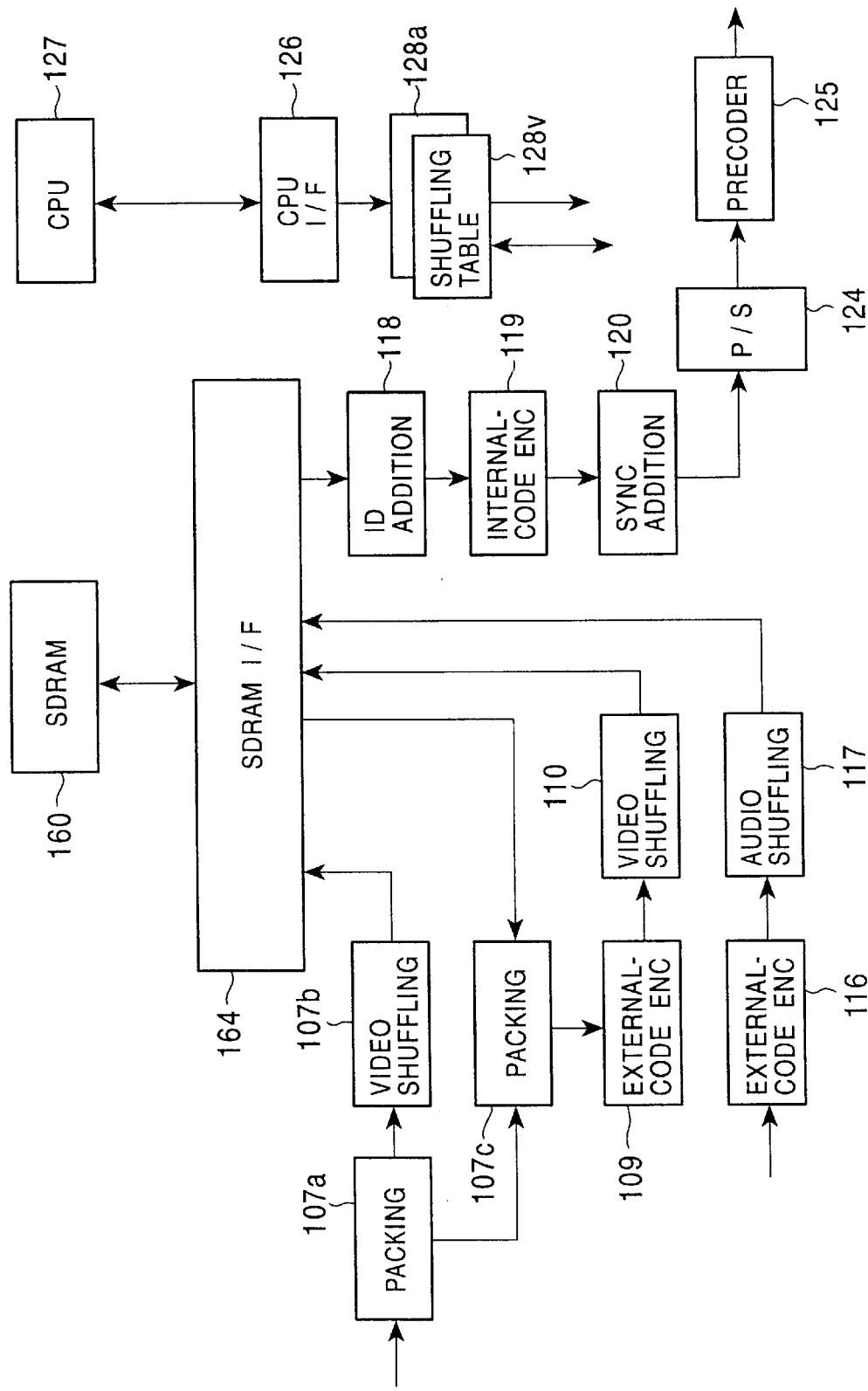
FIG. 11 is a more specific block diagram of a recording signal processing section.

FIG. 11 shows a more specific structure of the present embodiment of the present invention. In FIG. 11, an interface 164 for a main memory 160 externally attached to the IC controls read/write operations of the main memory 160. The packing and shuffling section 107 is formed of a packing section 107a, a video shuffling section 107b, and a packing section 107c.

In the present embodiment, the packing section 107a stores fixed-frame-length data and overflow portions in separate areas of the main memory (SDRAM) 160 by referring to the length information LT of each macroblock. The fixed-frame-length data is stored in a packing processing area of the main memory 160. When data having a length shorter than the fixed-frame length is stored, an open space is formed in the corresponding fixed frame in the main memory 160. The video shuffling section 107b controls the write address to perform shuffling.

The packing section 107c packs an overflow portion into a memory for the external-code encoder 109 and performs a read operation. In other words, fixed-frame-length data is read from the main memory 160 to a memory having a one-ECC-block size provided for the external-code encoder 109. If an open space exists in the fixed-frame-length data, an overflow portion is read and placed there so that the data fits in the fixed-frame-length area. When data of one ECC block is read, the reading operation is halted and the external-code encoder 109 generates external-code parities. The external-code parities are stored in the memory of the external-code encoder 109. When the external-code encoder 109 finishes processing for one ECC block, the data and the external-code parities from the external-code encoder 109 are rearranged in the order appropriate for internal-code processing and are written back to an internal-code processing area in the main memory 160, which is different from the packing processing area. The video shuffling section 110 controls addresses used for writing back the data for which external-code encoding has been finished into the main memory to perform shuffling in units of sync blocks.

Writing data (first packing processing) into a first area of the main memory 160 with fixed-frame-length data and overflow portions being separated, packing (second packing processing) the overflow portions in the memory provided for the external-code encoder 109 and reading them, generating external-code parities, and writing back the data and the external-code parities into a second area of the main memory 160 are performed in units of ECC blocks. Since the external-code encoder 109 is provided with the memory with a one-ECC-block size, the number of times the maim memory 160 is accessed is reduced.

When processing for a predetermined number of ECC blocks (32 ECC blocks, for example) included in one picture is finished, packing and external-code encoding are finished for one picture. Data read from the main memory 160 through the interface 164 is processed in the ID addition section 118, the internal-code encoder 119, and the synchronization addition section 120, and the data output from the synchronization addition section 120 is converted to bit-serial data by a parallel-serial conversion section 124. The output serial data is processed by a precoder 125 conforming to a partial response class 4. The output is digital-modulated as required and sent to the rotating head through the recording amplifier 121.

A sync block having no effective data, called a null sync may be placed in an ECC block to provide flexibility in the structure of the ECC block for a difference in the format of a recording video signal. A null sync is generated by the packing section 107a in the packing and shuffling section 107 and written into the main memory 160. Since a null sync has a data recording area, it can be used as a recording sync for an overflow portion.

The even-numbered and odd-numbered samples of audio data in one field form separate ECC blocks. Since an ECC external-code sequence is formed of audio samples arranged in the input order, the external-code encoder 116 generates an external-code parity every time audio samples for an external-code sequence are input. The shuffling section 117 controls addresses used for writing the outputs of the external-code encoder 116 into the main memory to perform shuffling (in units of channels and sync blocks).

A CPU interface 126 is further provided to enable data to be received from a CPU 127 serving as a system controller. The data includes shuffling table data and parameters related to the format of a recording video signal. The shuffling table data is stored in a video shuffling table (RAM) 128v and an audio shuffling table (RAM) 128a. The shuffling table 128v performs address conversion for shuffling in the video shuffling sections 107b and 110. The shuffling table 128a performs address conversion for the audio shuffling section 117.

The present invention is characterized in that a shuffling table prepared for a specified input image format or a data rate is stored in the video shuffling table 128v and the audio shuffling table 128a in order to allow a plurality of input image formats to be recorded in a plurality of data rates. Shuffling of video data will be described below as an example.

Figure 12:
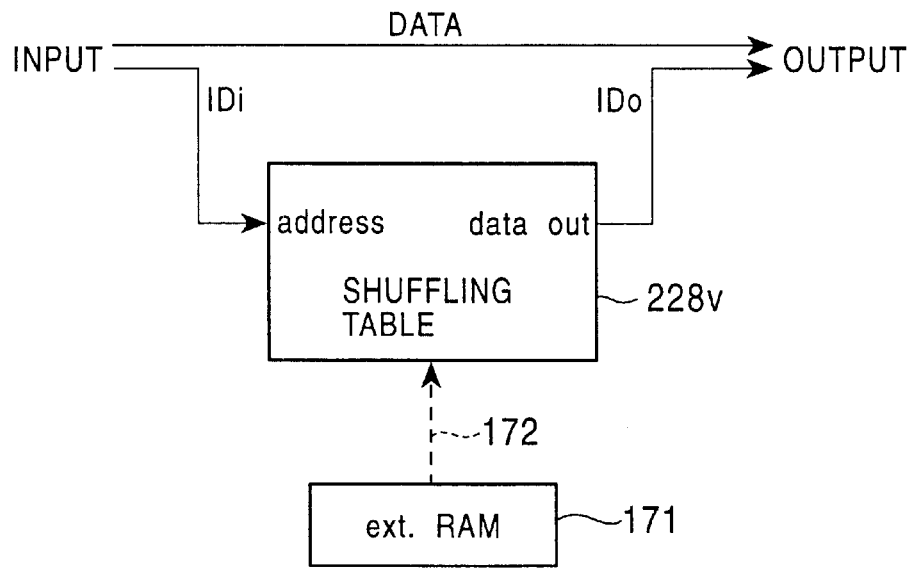
FIG. 12 is a block diagram showing a fundamental structure of a shuffling section.

FIG. 12 shows a basic principle of shuffling. An ID (or address) is added to input video data to indicate the position of the data from the top of a signal string. This ID uniquely specifies the position of the data, and can be a consecutive number from the top of a data sequence or a combination of a base and an offset. Shuffling is to rewrite this ID. A shuffling table 228v has a shuffling table written from an external memory 171 through a path 172.

The external memory 171 stores a plurality of shuffling tables corresponding to formats of video data to be shuffled. One shuffling table selected according to the result of format determination is stored in the shuffling table 228v. The format determination is performed, for example, according to information included in video data. The CPU selects a shuffling table according to the result of the format determination. Data is transmitted from the external memory 171 to the shuffling table 228v so as to obtain an sufficient operating speed and to reduce the number of input and output pins when the shuffling section is integrated into an IC. As described in the above embodiment, when the external memory 171 is a RAM or a ROM related to the CPU and an serial interface of the CPU serves as the path 172, only one pin for serial transfer is required. A shuffling table may be stored by the use of any other general interface.

Figure 13:
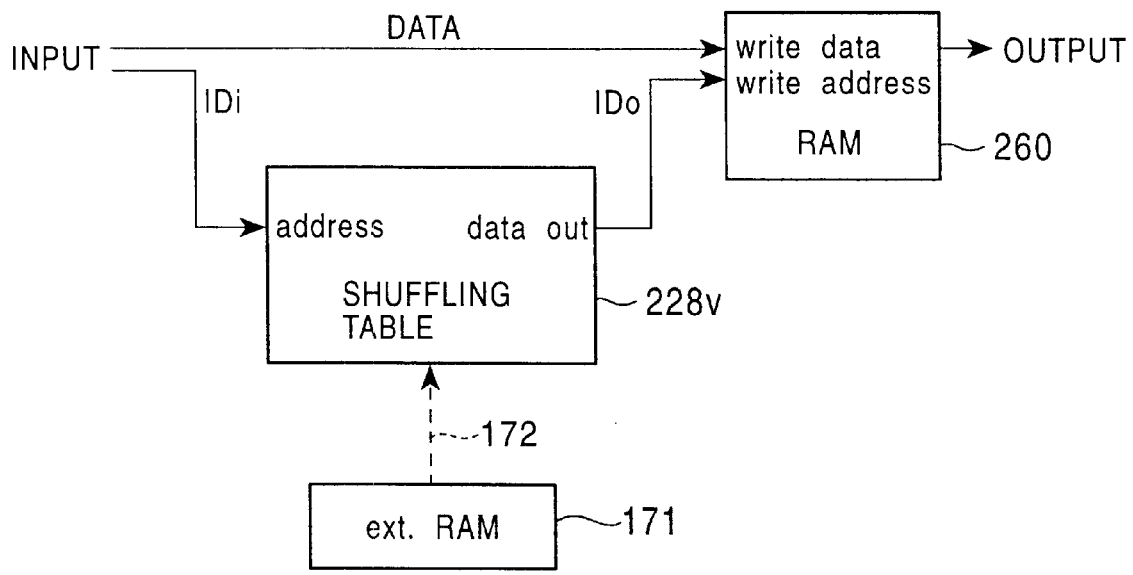
FIG. 13 is a block diagram showing a structure of a shuffling section employing a memory-write-address control method.

As described in the embodiment, shuffling is actually accompanied by data accumulation as shown in FIG. 13. Input data is written into a data-accumulation memory 260. The shuffling table 228v receives an IDi separated from the input data as an address and outputs a converted address IDo. The address IDo generated by the shuffling table 228v is used as a write address for writing data into the memory 260. With read addresses sequentially changing, shuffled data is read from the memory 260.

Figure 14:
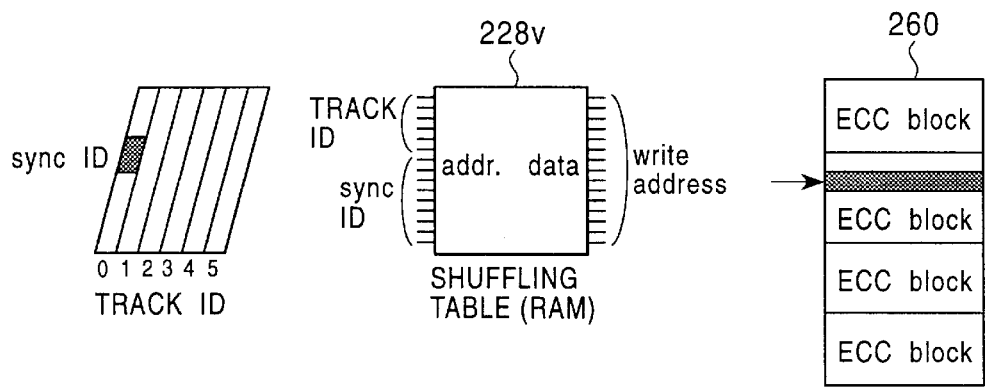
FIG. 14 is a block diagram showing a structure of a shuffling section employing a memory-write-address control method in a case in which the section is applied to a digital VCR.

As shown in FIG. 14, in a case in which data includes a track ID and a sync ID, and the position of a sync block in one frame, for example, in six tracks is uniquely determined, the track ID and the sync ID are sent to the shuffling table 228v as an address. The shuffling table 228v generates a write address for the memory 260. According to this write address, the sync block is written into the memory 260. The memory 260 has an area for storing each of one-frame, for example, four ECC blocks. Therefore, video data of one frame is dispersed and stored in the areas corresponding to four ECC blocks, in units of sync blocks.

Figure 15:
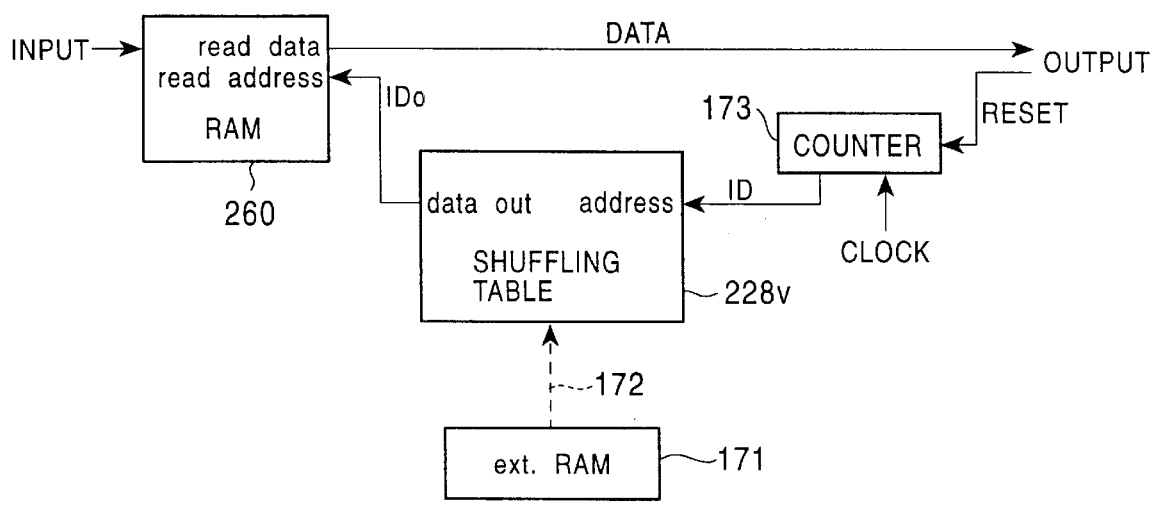
FIG. 15 is a block diagram showing a structure of a shuffling section employing a memory-read-address control method.
Figure 18A:
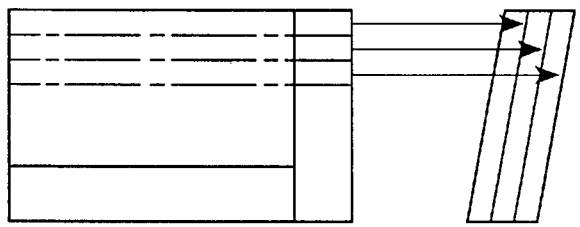
FIGS. 18A and 18B show a first advantage of shuffling.
Figure 18B:
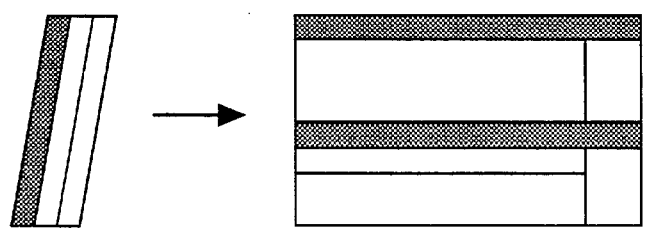
Figure 19A:
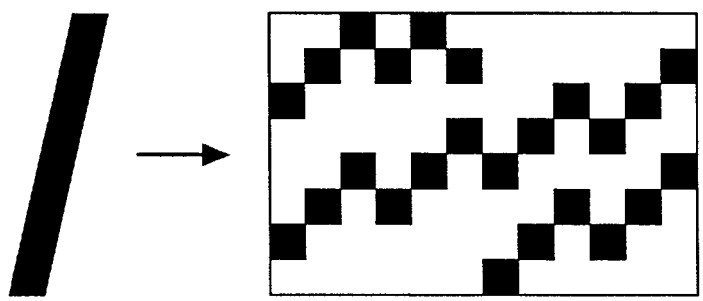
FIGS. 19A and 19B show a second advantage of shuffling.
Figure 19B:
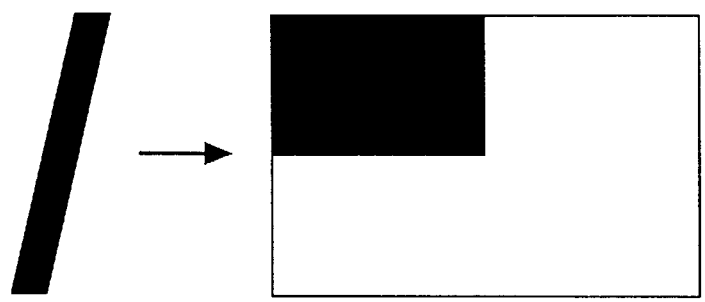
Figure 20A:
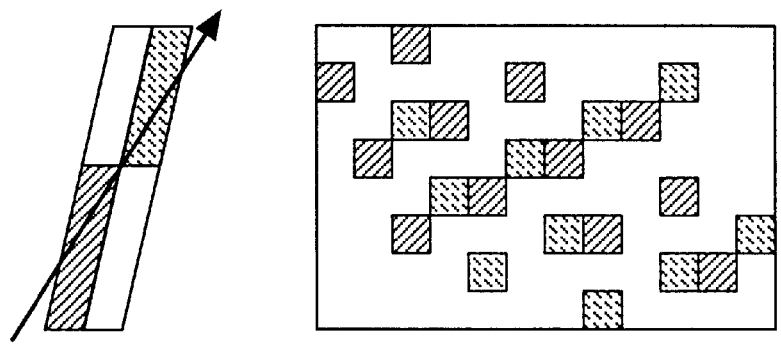
FIGS. 20A and 20B show a third advantage of shuffling.
Figure 20B:
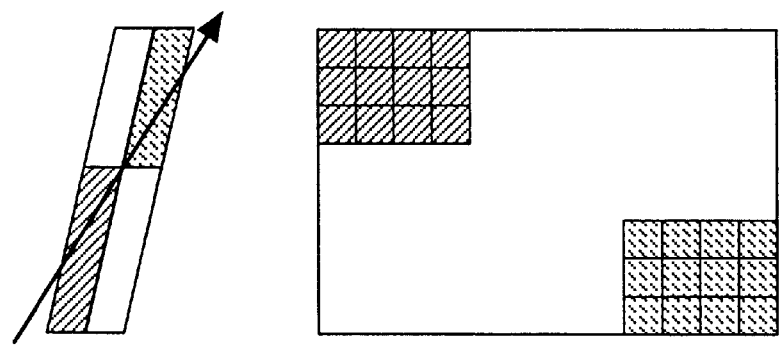

FIG. 15 shows an example in which shuffling is performed by controlling a read address of the memory 260. The shuffling table 228v stores a shuffling table sent from the external memory 171 and sends its output IDo to the memory 260 as a read address. A counter 173 generates an input IDi for the shuffling table 228v. The counter 173 is reset at the timing synchronized with data read from the memory 260, and generates IDo incremented by a clock. The memory 260 outputs data according to a read address (IDo) converted by the shuffling table 228v.

FIG. 16 roughly illustrates shuffling in which a read address is controlled. The counter 173 is reset by a reset signal generated for each of data to which a consecutive number is added at the output of the memory 260, and is incremented by a clock synchronized with a sync block. The count value which is incremented by one for each block is sent from the counter 173 to the shuffling table 228v as an address. The output of the shuffling table 228v is sent to the memory 260 as a read address. Therefore, data of one sync block is read at a read address of the memory 260.

The shuffling table 128v and the main memory 160 in the embodiment of the present invention correspond to the shuffling table 228v and the memory 260, respectively. Shuffling of audio data in units of channels and in units of sync blocks performed in the shuffling section 117 is also achieved by the shuffling table 128a.

The present invention can also be applied to a case in which video data and/or audio data are recorded into a tape-shaped recording medium other than a magnetic tape, such as an optical tape on which recording is allowed with laser light.

What is claimed is:

1. A data processing apparatus for rearranging digital information data to increase immunity against errors when recorded on a tape medium, comprising:

packing means for packing the digital information data into fixed-length frames whose length depends upon the format of the data;

an external-code encoder for encoding the digital information data output from the packing means using an external error-correcting-code and generating an external-code parity corresponding to the external-coded data;

a shuffling table memory for storing a shuffling table, for receiving positional information indicating the position of a data unit in the digital information data as an address, and for outputting converted positional information obtained by converting the positional information according to the shuffling table;

an external memory having a plurality of shuffling tables corresponding to formats of digital information data to be shuffled;

means for storing a shuffling table in said shuffling table memory selected from the plurality of shuffling tables in said external memory; the stored shuffling table being selected according to the format of the digital information data;

shuffling means for shuffling the digital information data output from the external-code encoder using the converted positional information, thereby shuffling the digital information data in accordance with the shuffling table; the shuffling means outputting the shuffled digital information along with the corresponding external-code parity in sync blocks; and an internal-code encoder for encoding the digital information data output from the shuffling means using an internal error-correcting-code and generating an internal-code parity corresponding to the internal-coded data; the internal-coded data being output in sync blocks along with the corresponding internal-code parity and external-code parity.

2. A data processing apparatus according to claim 1, further comprising a data accumulation memory for accumulating the digital information data, wherein said shuffling table memory outputs a write address of said data accumulation memory as the converted positional information.

3. A data processing apparatus according to claim 1, further comprising a data accumulation memory for accumulating the digital information data, wherein said shuffling table memory outputs a read address of said data accumulation memory as the converted positional information.

4. A data recording apparatus for rearranging digital information data to increase immunity against errors and for recording the rearranged digital information data on a tape medium, comprising:

a data accumulation memory for accumulating digital information data;

packing means for packing the digital information data into fixed-length frames whose length depends upon the format of the data;

an external-code encoder for encoding the digital information data output from the packing means using an external error-correcting-code and generating an external-code parity corresponding to the external-coded data;

a shuffling table memory for storing a shuffling table, for receiving positional information indicating the position of a data unit in the digital information data as an address, and for outputting a write or read address of said data accumulation memory by converting the positional information according to the shuffling table;

an external memory having a plurality of shuffling tables corresponding to formats of digital information data to be shuffled;

means for storing a shuffling table in said shuffling table memory selected from the plurality of shuffling tables in said external memory; the stored shuffling table being selected according to the format of the digital information data;

shuffling means for shuffling the digital information data output from the external-code encoder using the converted positional information, thereby shuffling the digital information data in accordance with the shuffling table; the shuffling means outputting the shuffled digital information along with the corresponding external-code parity in sync blocks; and an internal-code encoder for encoding the digital information data output from the shuffling means using an internal error-correcting-code and generating an internal-code parity corresponding to the internal-coded data; and recording means for recording the digital information data output from the internal-code encoder in sync blocks having the corresponding internal-code parity and external-code parity on said tape medium.

* * * * *